April 28, 1964 — F. W. POST — 3,130,750
DISTRIBUTING VALVE
Filed Nov. 23, 1959 — 3 Sheets-Sheet 1
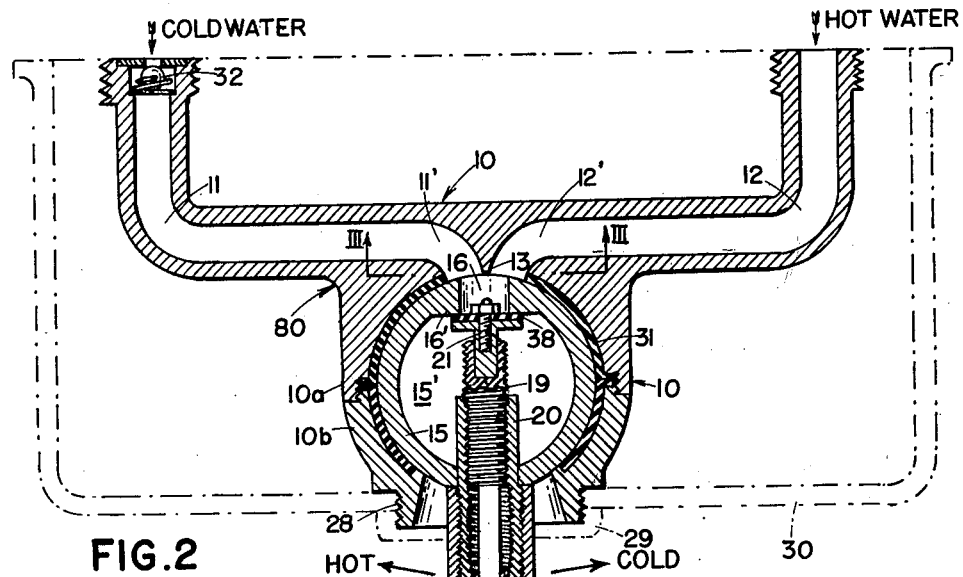
FIG. 2
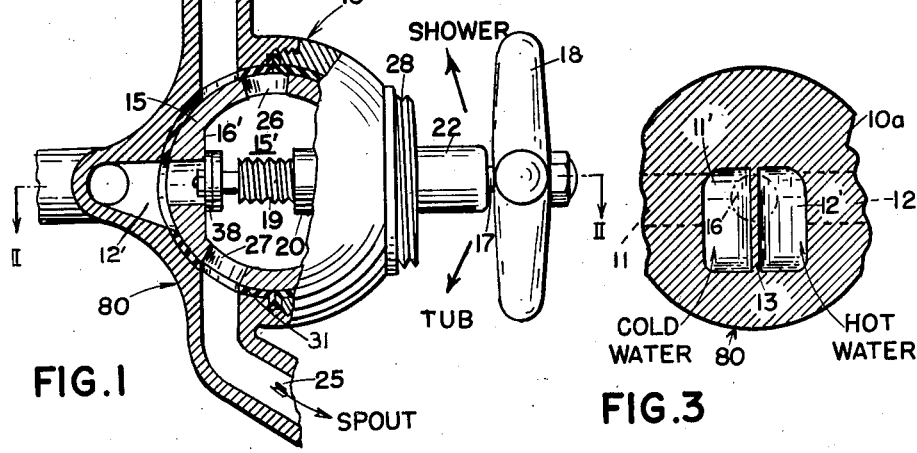
FIG. 1     FIG. 3
INVENTOR:
Fritz W. Post
BY
AGENT.

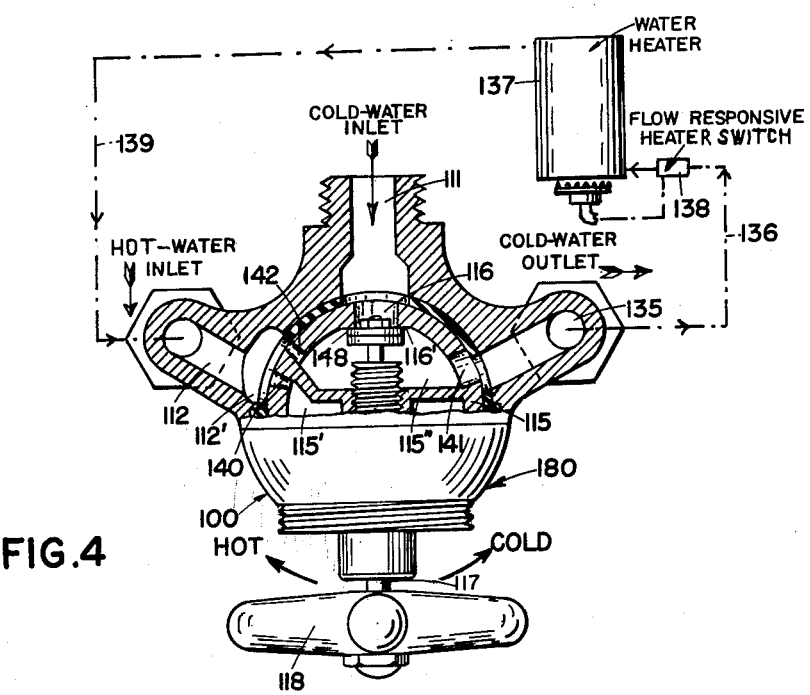
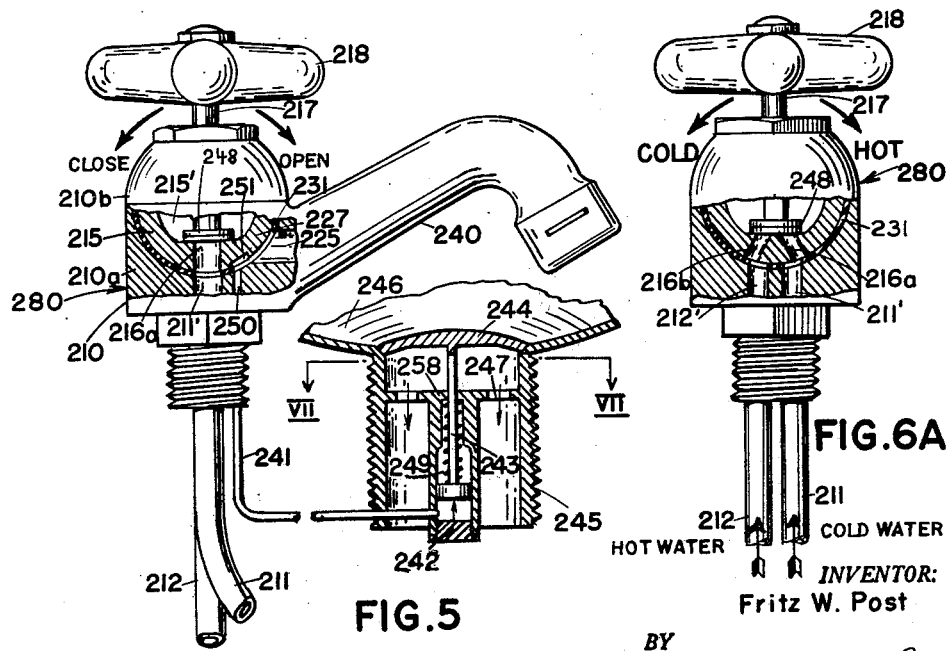

April 28, 1964     F. W. POST     3,130,750
DISTRIBUTING VALVE
Filed Nov. 23, 1959     3 Sheets-Sheet 3
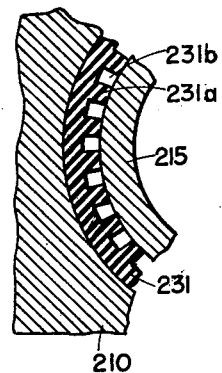
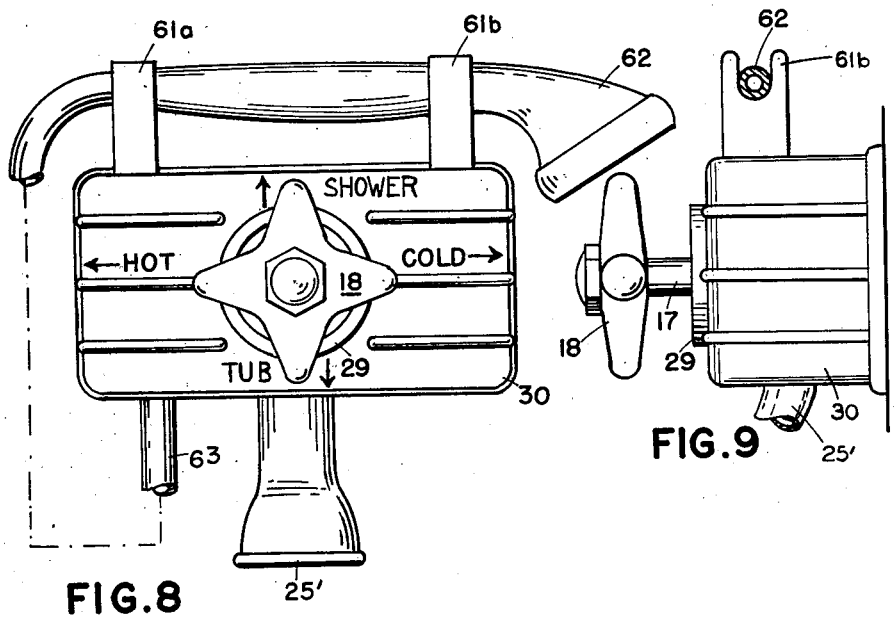
INVENTOR:
Fritz W. Post
BY
AGENT.

United States Patent Office 3,130,750
Patented Apr. 28, 1964

3,130,750
DISTRIBUTING VALVE
Fritz W. Post, Camphausenstrasse 19, Essen, Germany
Filed Nov. 23, 1959, Ser. No. 854,955
Claims priority, application Germany Nov. 25, 1958
5 Claims. (Cl. 137—636.3)

My present invention relates to distributing valves adapted to control the flow of liquid from an inlet to a plurality of outlets, or from a plurality of inlets to one or more outlets, and in particular to so-called mixing valves in which different liquids are combined in variable preparations for discharge through a common spout.

Mixing valves in use heretofore have generally required different control members for individually regulating the quantity of each fluid introduced into a mixing chamber and for adjusting the efflux rate of the mixture from the chamber.

It is an important object of my invention to provide a simple and efficient mixing valve for two fluids, e.g. streams of cold and hot water, having means for regulating the composition and the flow rate of a fluid mixture by a single manually operable control member.

Another object of the invention is to provide, in a valve of the character referred to, means for switching the outflow from the mixing chamber to one or another outlet, the switching means being actuated from the single control member.

A more specific object of the invention is the provision of a distributing valve to be used in conjunction with sanitary fixtures (e.g. bathtubs, wash basins, kitchen sinks or bidets) wherein a valve handle, adapted to regulate the flow velocity from and/or the composition of a water jet escaping from a spout, also is operable to control the opening or closing of a drain for the outflow of the water from the fixture.

Still another object of my invention is the provision of simple means for securing a protective and preferably also ornamental enclosure to a distributing valve of the type generally indicated above.

According to a feature of my invention, I provide a valve comprising a housing in which the inlet tubes for at least two fluids terminate, this housing forming a preferably spherical socket adapted to receive a rotary distributor in the shape of a complementary, preferably ball-shaped rocking member displaceable angularly about at least one axis thereof. The rocking member is provided with an inner mixing chamber having several bores, its interior forming a valve seat co-operating with a handle-controlled closure member displaceable in a direction transverse to the axis or axes of rotation of the rocking member to vary the amount of liquid which enters the chamber through one or more of these bores, communicating with respective inlets in different positions of the rocking member, prior to being discharged from the chamber through another bore or bores connected (or connectable) with one or more outlets.

According to another feature of the invention, a special outlet port in a valve housing accommodating the above-described rocking member leads to a hydraulic control device for the drain of an associated fluid receptacle, such as a bathtub or a sink, the rocking member being provided with a channel for connecting, in one of its angular positions, this outlet port with an inlet port whereby pressure of the incoming liquid can be used to control (e.g. to open) the drain. Advantageously, this channel is separated from the valve chamber within the rocking member so that, at least when the closure member is driven home against its seat, the hydraulically active liquid will be cut off from the other outlets of the valve; in a preferred embodiment, however, the channel is positionable to connect the special outlet port with another valve outlet when the hydraulic action is no longer desired, as when the user displaces the rocking member to close the drain.

The above and other objects, features and advantages of my present invention will become more readily apparent from the following description, reference being made to the accompanying drawing in which:

FIG. 1 is a side-elevational view, partly in section, of a bathroom-type mixing valve according to the invention;

FIG. 2 is a cross-sectional view taken along line II—II of FIG. 1;

FIG. 3 is a cross-sectional view taken along line III—III of FIG. 2;

FIG. 4 is a top-plan view, partly in section, of another embodiment of the invention;

FIG. 5 is a side-elevational view, partly in section, of still another mixing valve according to my invention;

FIG. 6A is a rear-elevational view, partly in section, of the valve shown in FIG. 5;

FIG. 6B is a detail view of a portion of the valve of FIGS. 5 and 6A;

FIG. 7 is a cross-sectional view taken along line VII—VII of FIG. 5;

FIG. 8 is a front-elevational view of the valve of FIGS. 1–3 provided with a protective cover; and FIG. 9 is a side-elevational view of the covered valve of FIG. 8.

In FIGS. 1–3 I show a mixing valve 80 comprising a housing 10 having a rear portion 10a and a front portion 10b threadedly secured thereto. The rear portion 10a is provided with a cold-water inlet 11 and a hot-water inlet 12, terminating in arcuate ports 11', 12', respectively, and separated by a wall 13 therebetween. The bipartite housing 10 forms a socket of substantially spherical configuration adapted to receive a generally spherical hollow rocking member or distributor 15 whose inner cavity forms a mixing chamber 15'. This mixing chamber communicates with inlet ports 11', 12' via a bore 16 whose diameter is, preferably, slightly less than the widths of the ports 11', 12' provided in member 15. The latter is further provided with valve means adapted to regulate the liquid flow through bore 16, including a valve stem 17 secured at one extremity to a handle 18 and provided at its other extremity with a male-threaded spindle 19 displaceable within a female-threaded sleeve 20 rigidly lodged in the member 15. The rear extremity of valve stem 17 carries a resilient washer 48, affixed thereto by a screw 21, designed to co-operate with a valve seat 16' surrounding the bore 16. A packing nut 22 is threaded onto the sleeve 20 to press a gasket 23 against the valve stem 17 and the sleeve 20, thus preventing any leakage therebetween.

As shown in FIG. 1, the housing 10 is provided further with a top outlet 24, adapted to be connected via a rigid or flexible conduit such as the tube 63 (FIG. 8) to a shower head 62 (FIGS. 8 and 9), and with a bottom outlet 25 communicating with a spout 25' (FIGS. 8 and 9). Rocking member 15 is provided with bore 26 alignable with outlet 24 and a bore 27 alignable with outlet 25. The front portion 10b of housing 10 has male threads 28 adapted to be received in a cap nut 29 for clamping a protective cover 30 to the valve housing as described further with reference to FIGS. 8 and 9. A resilient liner 31 is advantageously provided between the walls of the socket cavity and the rocking member 15 to prevent leakage therebetween and to impede spontaneous displacement of member 15.

In operation, valve stem 17 and rocking member 15 may be angularly displaced with the aid of handle 18 about a generally vertical axis perpendicular to the valve stem between a "hot" position (left) and a "cold" position (right) as marked on the cover 30 (see FIG. 8).

In the "hot" position of the valve assembly, bore 16 communicates fully with the hot-water inlet 12 at its port 12', thus permitting a flow of hot water therethrough upon the withdrawal of the washer 43 from the seat 16' by a counterclockwise rotation of the handle 18. The hot water flows through mixing chamber 15' and out through one of the outlets 24, 25. Should the valve stem 17 and the valve member 15 be displaced to the "cold" position, the cold water would flow through inlet 11, port 11' and bore 16 to mixing chamber 15'. In the intermediate positions between the extreme right-hand and left-hand positions, a liquid flow proportionate to the area of the bore 16 registering with each of the ports 11', 12' determines the relative quantities of each liquid admitted to the mixing chamber 15', the overall flow rate being controlled exclusively by the relative distance of washer 43 from seat 16' as adjusted by the rotation of handle 18. As best seen in FIG. 2, the efflux may be selectively directed into the shower outlet 24 or the tub outlet 25 by an angular displacement of valve stem 17 and member 15 about a horizontal second axis perpendicular to the aforementioned axis and to the stem, the two vertically spaced positions so provided being also marked on cover 30. As best seen in FIG. 3, the ports 11', 12' are so dimensioned with respect to bore 16 that the effective cross-sectional area of the entrance into that bore remains substantially constant in all the marked and intermediate operating positions of the valve assembly.

Advantageously, in the presence of substantial differences in pressure between the two incoming liquids, either or both inlets 11, 12 may be provided with check valves to prevent backflow as illustrated at 32 in FIG. 2.

In FIG. 4 I show a mixing valve 180 similar to valve 80 but particularly adapted to be used with a low-pressure heating system. This valve comprises a housing 100 and a substantially spherical rocking member 115 whose inner cavity is partitioned into a front chamber 115' and a rear chamber 115". The member 115 is provided with a bore 116 in constant communication with a cold-water inlet 111 connected to a source of relatively high water pressure; bore 116 is surrounded by a valve seat 116' cooperating with a closure member 148 movable within chamber 115" under the control of a handle 118. A cold-water outlet 135, terminating in the housing 100, is connected via a transmission pipe 136 to the entrance port of a water heater 137 having a flow-responsive switch 138 in the transmission pipe to actuate its heating element. The discharge port of the heater is connected by a transmission pipe 139 to the hot-water inlet 112 of the housing 100, which terminates in an enlarged channel 112' therein. The front chamber 115' communicates via a bore 140 with channel 112' in all operating positions of the valve. The rear chamber 115" opens into a bore 141, adapted to register with outlet 135, and into a bore 142, positionable to register progressively with channel 112' as bore 141 gradually moves out of alignment with outlet 135. Handle 118, mounted on a stem 117 carrying the washer 148, is swingable along with member 115 about two mutually perpendicular axes transverse to the stem for the purpose and in the manner previously described. It will be understood that member 115 and its socket cavity could be cylindrical if angular mobility about a horizontal axis (lying in the plane of the paper in FIG. 4) is not required.

When valve stem 117 and member 115 are angularly displaced in a clockwise direction (as viewed in FIG. 4) to the "hot" position in which handle 118 is on the left-hand side of the vertical plane of symmetry of the valve assembly, water flows, upon the unblocking of bore 116, into the rear chamber 115" and thence through outlet 135, pipe 136, heater 137, pipe 139, hot-water inlet 112, channel 112', bore 140 and front chamber 115' to, for example, a spout or a shower head as described with reference to the preceding embodiment. From its extreme left-hand position, in which all water entering through bore 116 is shunted to the hot-water heater 137, the handle 118 can be displaced rightwardly to the extreme "cold" position wherein the flow through bore 141 is cut off and all of the liquid permitted to pass bore 116 flows through bore 142 and thence via channel 112' into chamber 115'. In this position, since there is no flow into the water heater 137, no return flow of hot water is available to mix with the cold water. The water delivered to the valve outlet, therefore, is cold. In the intermediate positions of valve stem 117 and handle 118, part of the cold water introduced at bore 116 is circulated through the water heater and returned to the valve where it enters the chamber 115' through channel 112'. Simultaneously, the remainder of the cold water is bypassed through bore 142 into the channel 112', where it is admixed with the heated water, into chamber 115'. The temperature of the effluent liquid will, therefore, depend upon the relative quantities of cold water traversing and bypassing the heater 137 as determined by the azimuth of the valve stem 117. It will be readily apparent that the water entering the chamber 115' and that circulated through the water heater are of substantially the same pressure, the valve of FIG. 4 thus helping to obviate the objectionable knocking commonly encountered in systems where pressure differentials between the hot and the cold water lines are relatively large. A valve of this type is particularly suitable for localized water heating in the absence of central hot-water systems.

In FIGS. 5, 6A and 6B I show a mixing valve 280 particularly suited for use in wash basins and the like. The valve comprises a housing 210 whose upper housing portion 210b and lower housing portion 210a enclose a substantially spherical rocking member 215. The inner cavity of member 215 forms a mixing chamber 215' provided with a pair of inlet bores 216a, 216b which are simultaneously closable by a washer 248 on a valve stem 217 carrying a handle 218 as described with reference to the valve stems 17 and 117. The member 215 is provided further with an outlet bore 227 adapted to establish communication between the mixing chamber 215' and a spout 240 whose outlet channel 225 terminates in the lower housing portion 210a. A cold-water inlet 211 and a hot-water inlet 212 terminate in a pair of ports 211' and 212', respectively. Ports 211' and 212' are progressively alignable with bores 216a and 216b, respectively, by an angular displacement of rocking member 215 about an axis which, in the position of stem 217 shown in FIG. 6A, is perpendicular to the plane of the paper in that figure; thus, as described for the preceding embodiments, the valve 280 can also be moved by its handle 218 from an extreme "hot" through an infinite number of intermediate positions to an extreme "cold" position.

FIGS. 5 and 7 illustrate how a distributing or mixing valve according to the invention can be used to open and close the drain of an associated wash basin. A tube 241 forms a hydraulic connection communicating with the interior of a hydrostatic cylinder 242 beneath a piston 243 connected to the stopper 244 of the drain. The drain further comprises a cylinder 245 mounted in the basin 246 of which only an annular portion, forming a seat for the stopper 244, has been illustrated. The effluent from the basin flows through the drain via ports 247 in a screen 258, which supports the cylinder 243 coaxially with cylinder 245, and thence into a waste pipe (not shown) in the raised position of stopper 244. A restoring spring 249, disposed in cylinder 242, urges the piston 243 and the stopper 244 downwardly, thus closing the drain in the absence of a hydraulic counterforce below the piston. This counterforce is advantageously provided by connecting the tube 241 with a special outlet port of valve 280. Tube 241 terminates in a port 250 in the housing 210, adapted to communicate selectively, via an arcuate channel 251 in the rocking member 215, with inlet port 211′ in one angular position of member 215 and with outlet port 225 in a second position thereof. Upon the displacement of rocking member 215 to the "open" position (handle 218 pulled forward), cylinder 242 is put under hydraulic pressure via port 211′, channel 251, port 250 and tube 241, the stopper 244 thus being raised; upon a rearward displacement of the handle 218 in the plane of the paper (FIG. 5) to the "close" position, channel 251 is shifted to connect the cylinder 242 with the outlet 225, thus relieving the pressure and permitting the stopper 244 to close the drain under the urging of spring 249.

Between the rocking member 215 and its socket, as in the preceding embodiments, I provide a resilient liner 231 which, as best seen in FIG. 6B, is formed with ribs 231a and grooves 231b. By this reduction in the surface area of the liner 231 the angular displacement of the rocking member 215 is greatly facilitated while leakage is prevented between the member and its socket. The liner may be cemented to the valve housing 10, 110, 210, e.g. with adhesive resins resistant to heat and water, or may be bonded to the suitably coated or otherwise pretreated housing wall by vulcanization or polymerization.

Reference is now made to FIGS. 8 and 9 illustrating the cover 30 and the cap nut 29 serving to fasten it to the valve housing. The housing 30 may be provided with support brackets 61a, 61b adapted to carry the spray head 62, connected to outlet 24 by flexible pipe 63, when the head 62 is not in use. The provision of this cover dispenses with the need for a finished exterior on the valve assembly and enables the latter to be mass-produced by casting, compression molding and similar processes without attention to its outward appearance. This cover, besides protecting the user from accidental contact with hot parts of the assembly, also may be ornamentally designed and made of attractive (e.g. colored) plastic. If desired, the connecting tubes leading to the inlet ports of the valve within the cover may be made of flexible material for convenience of installation.

Although the invention has been described with reference to a mixing valve for sanitary fixtures, it will be readily apparent that, with minor modification well within the ken of persons skilled in the art, a distributing valve as herein disclosed may be adapted to other mixing operations (e.g. for gases), and to other auxiliary operations in addition to or in place of the control of a drain, without deviating from the spirit and scope of the invention except as further limited by the accompanying claims. Thus it will be understood, for example, that the two exit ports 24, 25 of FIG. 1 could cooperate with a single outlet aperture on the associated rocking member, as illustrated for the inlet aperture 16 and the two intake ports 11′, 12′ in FIGS. 2 and 3, and/or that the handle-controlled closure member 48, 148, 248 could regulate the rate of outflow of the liquid from the valve chamber, rather than the rate of inflow into same, by co-acting with a valve seat formed around one or more outlet apertures of the rocking member in substantially the manner illustrated in the various figures of the drawing for the inlet apertures 16, 116 and 216a, 216b.

I claim:

1. A distributing valve comprising a ball-shaped rocking member provided with an inner distributing chamber and a plurality of apertures leading to said chamber, said member forming a valve seat in said chamber around one of said apertures, an elongated stem extending through said member and terminating within said chamber, closure means on said stem within said chamber, said stem being rotatable in said member for selectively moving said closure means toward and away from said seat whereby said one of said apertures can be closed and opened to a varying extent for regulating the flow of a fluid through said one of said apertures, a housing forming a socket around said member, said member being rotatable in said socket about two mutually perpendicular axes generally transverse to said stem, said stem having an extremity projecting outwardly from said housing, said housing being provided with a pair of first ports and a pair of second ports, first conduit means including a pair of conduits positioned externally of said housing and each exterminating at a respective one of said first ports, second conduit means including another pair of conduits positioned externally of said housing and each terminating at a respective one of said second ports, the conduits of one of said conduit means being connectable to sources of incoming fluid, the conduits of the other of said conduit means being adapted to discharge said fluid, said member having two positions of rotation about one of said axes in which said chamber communicates with selectively said first ports via one of said apertures and selectively communicates with said second ports through said chamber via others of said apertures, and a handle on said extremity for operating said closure means by rotation of said stem in said member and for swinging said member about said axes.

2. A valve according to claim 1 wherein said member has an infinite number of intermediate positions of rotation about each of said axes in which said chamber communicates to a progressively greater extent with one and to a progressively less extent with the other of said first and second ports respectively.

3. A distributing valve comprising a ball-shaped rocking member provided with an inner distributing chamber and a plurality of apertures leading to said chamber, said member forming a valve seat in said chamber around one of said apertures, an elongated stem extending through said member and terminating within said chamber, closure means on said stem within said chamber, said stem being rotatable in said member for selectively moving said closure means toward and away from said seat whereby said one aperture can be closed and opened to a varying extent for regulating the flow of a fluid through said one aperture, a housing forming a socket around said member, said member being rotatable in said socket about two mutually perpendicular axes generally transverse to said stem, said stem having an extremity projecting outwardly from said housing, said housing being provided with a pair of fluid-intake ports and a pair of fluid-exit ports, said member having two positions of rotation about one of said axes in which said chamber communicates selectively with one of said exit ports via at least one other of said apertures, said intake ports respectively communicating with said chamber via said one aperture in two positions of rotation about the other of said axes, and a handle on said extremity for operating said closure means by rotation of said stem in said member and for swinging said member about said axis.

4. A distributing valve comprising a ball-shaped rocking member provided with an inner distributing chamber, a first apertured portion constituting an inlet to said chamber and a second apertured portion constituting an outlet from said chamber, said member forming a valve seat in said chamber around one of said apertured portions, an elongated stem extending through said member and terminating within said chamber, closure means on said stem within said chamber, said stem being rotatable in said member for selectively moving said closure means toward and away from said seat whereby said one apertured portion can be closed and opened to a varying extent for regulating the flow of a fluid through said one apertured portion, a housing forming a socket around said member, said member being rotatable in said socket about two mutually perpendicular axes generally transverse to said stem, said stem having an extremity projecting outwardly from said housing, said housing being provided with a pair of fluid-intake ports and at least two fluid-exit ports, said member having a first limiting position of rotation about one of said axes in which said inlet communicates exclusively with one of said intake ports, a second limiting position of rotation about said axis in which said inlet communicates exclusively with the other intake port, and an infinite number of intermediate positions of rotation about said axis in which said inlet communicates to a progressively greater extent with one and to a progressively less extent with the other of said intake ports, said member being swingable between a first and a second position of angular motion about the other of said axes, said outlet registering with a first one of said exit ports in said first position of angular motion and with the other of said exit ports in said second position of angular motion about said other of said axes irrespectively of the position of rotation of said member about said one of said axes, and a handle on said extremity for operating said closure means by rotation of said stem in said member and for swinging said member about said axis.

5. A distributing valve comprising a generally spherical rocking member provided with an inner distributing chamber, a first apertured portion constituting an inlet to said chamber and a second apertured portion constituting an outlet from said chamber, said member forming a valve seat in said chamber around said inlet, an elongated stem extending through said member and terminating within said chamber, closure means on said stem within said chamber, said stem being rotatable in said member for selectively moving said closure means toward and away from said seat whereby said inlet can be closed and opened to a varying extent for regulating the flow of a fluid into said chamber, a housing forming a socket around said member, said member being rotatable in said socket about two mutually perpendicular axes generally transverse to said stem, said stem having an extremity projecting outwardly from said housing, said housing being provided with a pair of fluid-intake ports and a pair of fluid-exit ports, said member being rotatable about one of said axes for aligning said inlet to a progressively greater extent with one of said intake ports and to a progressively less extent with the other of said intake ports, said member being further rotatable about the other of said axes for aligning said outlet to a progressively greater extent with one of said exit ports and to a progressively less extent with the other of said exit ports, and a handle on said extremity for operating said closure means by rotation of said stem in said member and for swinging said member about said axes, and a generally spherical resilient liner at least partially enveloping said member, said liner being provided with an opening aligned with said port.

References Cited in the file of this patent
UNITED STATES PATENTS

| | | |
|---|---|---|
| 1,478,688 | Whidden | Dec. 25, 1923 |
| 2,050,273 | Chamberlin | Aug. 11, 1936 |
| 2,117,907 | Ogden | May 17, 1938 |
| 2,309,839 | Gardner | Feb. 2, 1943 |
| 2,776,104 | Sinkler | Jan. 1, 1957 |
| 2,818,581 | Miller | Jan. 7, 1958 |
| 2,838,070 | Williams | June 10, 1958 |
| 2,842,155 | Peters | July 8, 1958 |
| 2,847,027 | Kumpman | Aug. 12, 1958 |
| 2,847,681 | Jacobs | Aug. 19, 1958 |